(12) United States Patent
Guim Bernat et al.

(10) Patent No.: US 11,121,940 B2
(45) Date of Patent: Sep. 14, 2021

(54) TECHNIQUES TO MEET QUALITY OF SERVICE REQUIREMENTS FOR A FABRIC POINT TO POINT CONNECTION

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Andrew Herdrich, Hillsboro, OR (US); Edwin Verplanke, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 979 days.

(21) Appl. No.: 15/470,664

(22) Filed: Mar. 27, 2017

(65) Prior Publication Data

US 2018/0278493 A1    Sep. 27, 2018

(51) Int. Cl.
| | |
|---|---|
| *H04L 12/851* | (2013.01) |
| *H04L 12/701* | (2013.01) |
| *H04L 12/911* | (2013.01) |
| *H04L 12/24* | (2006.01) |
| *H04L 12/947* | (2013.01) |
| *H04L 5/00* | (2006.01) |

(52) U.S. Cl.
CPC ........ *H04L 41/5019* (2013.01); *H04L 5/0055* (2013.01); *H04L 41/0896* (2013.01); *H04L 41/5003* (2013.01); *H04L 47/783* (2013.01); *H04L 49/25* (2013.01)

(58) Field of Classification Search
CPC ............. H04L 41/5003; H04L 41/5019; H04L 47/805; H04L 47/2425; H04L 67/322
See application file for complete search history.

(56) References Cited

U.S. PATENT DOCUMENTS

| | | | |
|---|---|---|---|
| 2005/0114541 A1* | 5/2005 | Ghetie ................ | H04L 47/2425 709/232 |
| 2006/0212594 A1* | 9/2006 | Haner .................. | H04L 67/322 709/232 |
| 2018/0198732 A1* | 7/2018 | Karthikeyan ......... | H04L 67/322 |
| 2019/0268798 A1* | 8/2019 | Jeong .................... | H04W 28/02 |

* cited by examiner

*Primary Examiner* — Scott M Sciacca
(74) *Attorney, Agent, or Firm* — Compass IP Law PC

(57) ABSTRACT

Examples include techniques to meet quality of service (QoS) requirements for a fabric point to point connection. Examples include an application hosted by a compute node coupled with a fabric requesting bandwidth for a point to point connection through the fabric and the request being granted or not granted based at least partially on whether bandwidth is available for allocation to meet one or more QoS requirements.

24 Claims, 12 Drawing Sheets

700

RECEIVE A REQUEST FROM A FIRST APPLICATION HOSTED BY A FIRST COMPUTE NODE COUPLED WITH A FABRIC, THE REQUEST INCLUDING PARAMETERS FOR A POINT TO POINT CONNECTED ROUTED THROUGH AT LEAST ONE SWITCH INCLUDED IN THE FABRIC, THE PARAMETERS INCLUDING A TARGETED SECOND APPLICATION HOSTED BY A SECOND COMPUTING NODE COUPLED WITH THE FABRIC AND A REQUESTED BANDWIDTH THROUGH THE FABRIC TO MEET ONE OR MORE QoS REQUIREMENTS FOR THE POINT TO POINT CONNECTION
702

ADD AN IDENTIFIER TO THE REQUEST THAT INCLUDES BOTH A FIRST IDENTIFIER FOR THE FIRST APPLICATION AND A SECOND IDENTIFIER FOR THE FIRST COMPUTE NODE
704

FORWARD THE REQUEST WITH THE IDENTIFIER TO A MANAGER FOR THE FABRIC
706

RECEIVE AN INDICATION WHETHER THE REQUEST HAS BEEN GRANTED BY THE MANAGER, THE INDICATION INCLUDING A ROUTE THROUGH THE FABRIC FOR THE POINT TO POINT CONNECTION AND ALLOCATED BANDWIDTH FOR THE POINT TO POINT CONNECTION IF THE REQUEST WAS GRANTED
708

*FIG. 7*

Storage Medium *800*

Computer Executable Instructions for 700

RECEIVE A REQUEST ORIGINATING FROM A FIRST APPLICATION HOSTED BY A FIRST COMPUTE NODE COUPLED WITH A FABRIC, THE REQUEST HAVING AN IDENTIFIER THAT IDENTIFIES BOTH THE FIRST APPLICATION AND THE FIRST COMPUTE NODE, THE REQUEST INDICATING A TARGETED SECOND APPLICATION HOSTED BY A SECOND COMPUTE NODE COUPLED WITH THE FABRIC, THE REQUEST ALSO INDICATING A REQUESTED BANDWIDTH THROUGH THE FABRIC TO MEET ONE OR MORE QoS REQUIREMENTS FOR THE POINT TO POINT CONNECTION
*1002*

DETERMINE WHETHER A ROUTE FOR THE POINT TO POINT CONNECTION THROUGH THE FABRIC HAS ENOUGH AVAILABLE BANDWIDTH TO MEET THE ONE OR MORE QoS REQUIREMENTS
*1004*

SEND AN INDICATION OF WHETHER THE REQUEST HAS BEEN GRANTED, THE INDICATION INCLUDING A ROUTE THROUGH THE FABRIC FOR THE POINT TO POINT CONNECTION AND ALLOCATED BANDWIDTH FOR THE POINT TO POINT CONNECTION IF THE REQUEST WAS GRANTED
*1006*

FIG. 10

*Storage Medium 1100*

*Computer Executable Instructions for 1000*

*FIG. 11*

TECHNIQUES TO MEET QUALITY OF SERVICE REQUIREMENTS FOR A FABRIC POINT TO POINT CONNECTION

TECHNICAL FIELD

Examples described herein are generally related to implementing point to point service level agreements for applications hosted by compute nodes coupled with a fabric.

BACKGROUND

Growth of cloud-based deployments of compute nodes located or situated in data centers has been accelerating. Data centers that just a few years ago, included around the low hundreds of compute nodes or servers may now include tens of thousands of compute nodes. Additionally, compute nodes having one or more multi-core processors that may be configured to host multiple virtual machines (VMs) and/or containers that may separately execute one or more applications. This accelerating growth of compute nodes hosting VMs/containers separately executing applications in a given data center has brought forth a sharp focus on resource provisioning, resource management and meeting quality of service (QoS) requirements associated with service level agreements (SLAs).

BRIEF DESCRIPTION OF THE DRAWINGS

FIG. 7 illustrates an example of a first logic flow.
FIG. 8 illustrates an example of a first storage medium
FIG. 10 illustrates an example of a second logic flow.
FIG. 11 illustrates an example of a second storage medium.

DETAILED DESCRIPTION

As contemplated by the present disclosure, accelerating growth in data centers having compute nodes hosting VMs/containers separately executing applications has brought forth a sharp focus on resource provisioning, resource management and meeting QoS requirements associated with SLAs. A challenge of current data center architectures may be that compute node and application abstractions for meeting QoS requirements do not match abstractions being provided by fabrics via which applications executed at a compute node may establish point to point connections. However, even though mechanisms for meeting QoS requirements associated with SLAs may operate at an application abstraction, QoS requirements for a fabric are typically expressed in terms of virtual channels, virtual interfaces or traffic classes that may be shared among a set of applications.

It may be possible to use current fabric abstractions for meeting QoS requirements to scale compute nodes hosting VMs/containers executing applications up to a certain, fixed limit. An example scheme may include each application requesting and provisioning certain virtual channels or lanes on a greedy, ad-hoc basis. An immediate limitation of such a scheme may be that current and future fabric architectures may limit dedicated channels that each application may provision for a point to point connection through the fabric. For example, some current fabrics operated per Intel® Corporation's Fabric Technology using the Intel Omni-Path architecture (Intel OPA) or per one or more Ethernet specifications may restrict virtual channels, virtual interfaces, virtual fabrics or traffic classes to only a few dozen. Also, a single switch deployed in these current fabrics may be coupled to many dozens of compute nodes having increasing core counts for multi-core processors capable of hosting a large number of VMs/containers. The large number of VMs/containers may be arranged to execute a total number of applications that may be in the hundreds to thousands of applications. Further, each of these applications may need independent point to point bandwidth QoS requirements in order to meet individual SLAs. Restricting virtual channels, virtual interfaces, virtual fabrics or traffic classes to only a few dozen is problematic to enabling hundreds to thousands of applications to meet point to point bandwidth QoS requirements.

Figure 1:
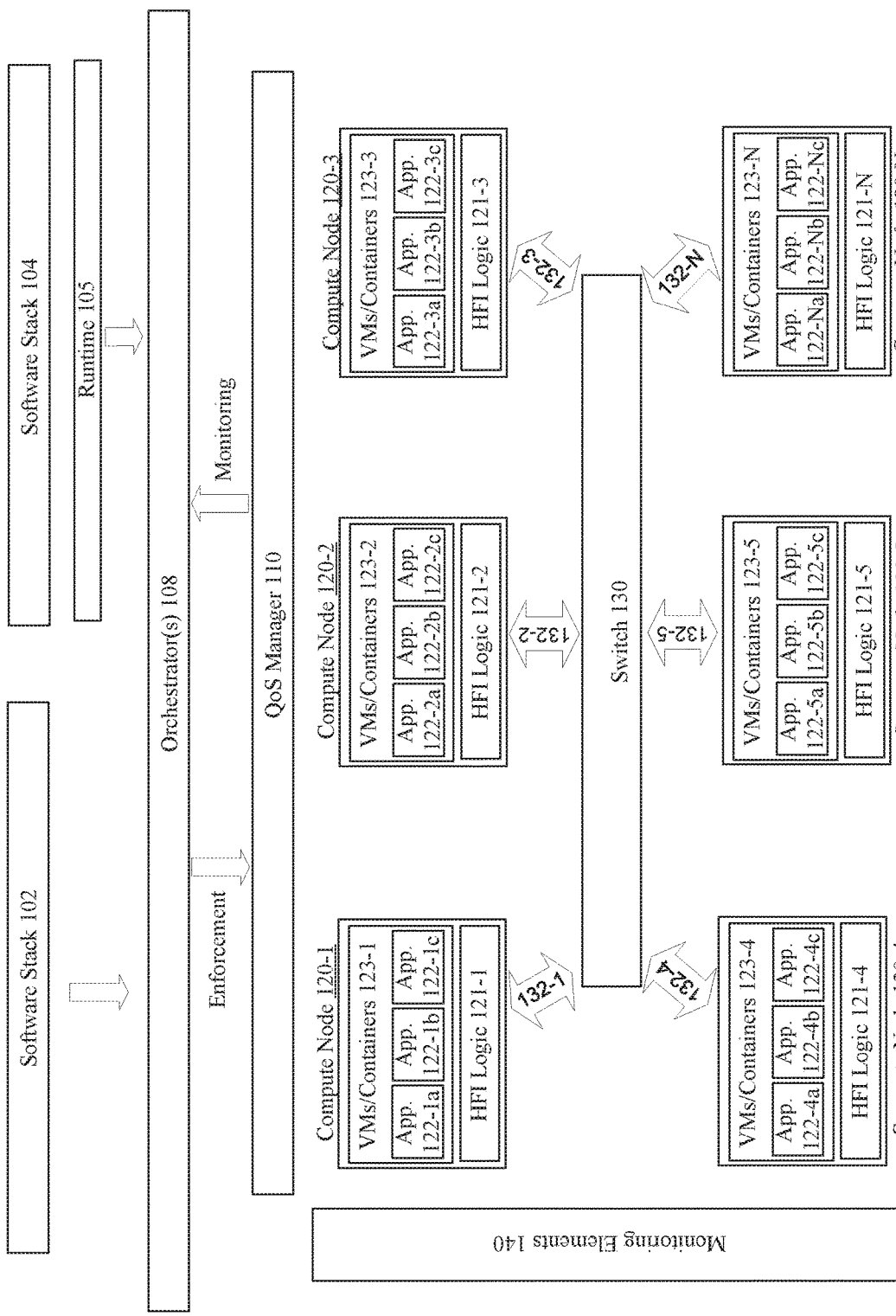
FIG. 1 illustrates an example first system.

FIG. 1 illustrates an example system 100. In some examples, system 100 may represent at least a portion of data center, a high performance computing (HPC) network, a telecommunications core network, an enterprise network or cloud-based distributed network. As shown in FIG. 1, system 100 includes a software stack 102 that may be arranged to configure one or more orchestrator(s) 108 to orchestrate the provisioning of resources for elements of system 100. Also, in some examples, a software stack 104 may be arranged to operate orchestrator(s) 108 during runtime 105 in order to manage and/or control the provisioned resources of system 100.

According to some examples, as described more below, a quality of service (QoS) manager 110 may be arranged to facilitate enforcement and monitoring of QoS requirements associated with service level agreements (SLAs) established for various entities (e.g., tenants or customers) for which resources have been provisioned by orchestrator(s) 108. For these examples, compute nodes 120-1 to 120-N, where "N" is any whole positive integer greater than 1, may be part of the provisioned resources arranged to host respective VMs and/or containers 123-1 to 123-N. VMs/containers 123-1 to 123-N may represent a further provisioning of resources to execute respective applications 122-1a,b,c to 122-Na,b,c.

In some examples, applications 122-1a,b,c to 122-Na,b,c may be associated with tenants or customers and may have SLAs with an operator and/or owner of system 100. Each SLA may have one or more respective QoS requirements. The one or more respective QoS requirements may include, but are not limited to, bandwidth requirements (e.g. gigabits per second (Gbps)) or latency requirements for respective point to point connections that may route data between applications hosted by separate compute nodes 120-1 to 120-N through a fabric. The fabric may include switch 130 and the respective point to point connections may be routed through links 132-1 to 132-N that couple respective compute nodes 120-1 to 120-N with switch 130.

According to some examples, as shown in FIG. 1, compute nodes 120-1 to 120-N include respective host fabric interface (HFI) logic 121-1 to 121-N. HFI logic 121-1 to 121-N may include communication logic and/or features to facilitate communications through links 132-1 to 132-N coupled with switch 130. As described more below, HFI logic 121-1 to 121-N may also include logic and/or features responsible to forward point to point SLA requests from applications related to meeting one or more QoS requirements associated with SLAs for the requesting applications. Also, as described more below, QoS manager 110 may include logic and/or features to receive SLA requests, grant the SLA requests, allocate routes through switch 130 to fulfill SLA requests and track granted SLA requests. In some examples, logic and/or features included in HFI logic 121-1 to 12-N may also be arranged to control injection rates for applications having SLA requests that have been granted by QoS manager 110. The logic and/or features included in HFI logic 121-1 to 121-N may also track information related to how the granted SLA requests are meeting QoS requirements.

In some examples, monitoring elements 140 may include system telemetry to provide information to logic and/or features of QoS manager 110 to monitor routes associated with point to point connections between hosted applications through switch 130 via links 132-1 to 132-N. Monitoring information gathered or collected from monitoring elements 140 may allow logic and/or features at QoS manager 110 to allocate routes through switch 130 to fulfill SLA requests. Monitoring information may include, but is not limited to, measuring available bandwidth or latency for routes that connect applications hosted by separate compute nodes in point to point connections.

According to some examples, compute nodes 120 may be embodied as any type of compute and/or storage device that is capable of performing the functions described herein, such as, without limitation, a server (e.g., stand-alone, rack-mounted, blade, etc.), a network appliance (e.g., physical or virtual), a web appliance, a distributed computing system, and/or a multiprocessor-based system. It should be appreciated that those compute nodes 120 implemented as storage nodes may generally include more data storage capacity than those compute nodes 120 that are embodied as compute nodes. Similarly, it should also be appreciated that those compute nodes 120 implemented as compute nodes may generally include more processor capability that those compute nodes 120 implemented as storage nodes. In other words, the storage nodes may be embodied as physical servers including numerous hard-disk drives (HDDs) or solid-state drives (SDDs) relative to the number of storage devices of the compute nodes, whereas the compute nodes may be embodied as physical servers including numerous processors having multiple cores relative to the number of processors of the storage nodes. However, it should be further appreciated that any of the compute nodes 120 may be implemented as a compute node and/or a storage node, regardless of the component configuration relative to the other compute nodes 120.

In some examples, elements of system 100 such as HFIs 121-1 to 121-N, links 132-1 to 132-N and switch 130 may be arranged to operate according to various fabric technologies and/or network specifications. Fabric technologies may include, but are not limited to Intel's STL Fabric Technology. Network specifications may include, but are not limited to, one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3").

Figure 2:
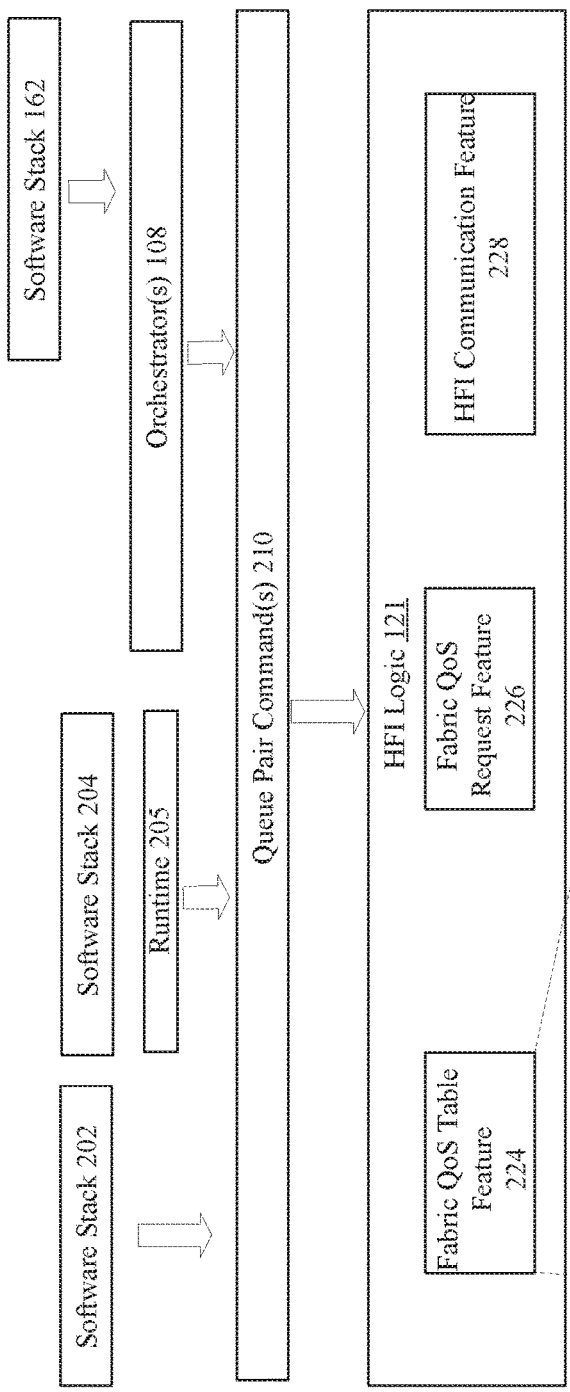
FIG. 2 illustrates an example second system.

FIG. 2 illustrates an example system 200. In some examples, as shown in FIG. 2, system 200 includes HFI logic 121. For these examples, HFI logic 121 as shown in FIG. 2, may be a more detailed view to illustrate logic and or features included in HFI logic 121 at a compute node 120. Also, as mentioned previously for FIG. 1, software stack 102 may be arranged to configure orchestrator(s) 108 to provision resources for elements of system 100 such as HFI logic 121. Orchestrator(s) 108 may cause the provisioning of resources to elements of a compute node such as HFI logic 121 via one or more queue pair command(s) 210.

According to some examples, software stack 202 may include a compute node specific software stack to facilitate configuration of HFI logic 121 for operation at the compute node via queue pair command(s) 210. Also, software stack 204 may include additional compute node specific software to operate HFI logic 121 during a runtime 205. In some examples, applications 122a,b,c hosted by a given compute node 120 may utilize queue pair command(s) to place SLA requests to HFI logic 121. These SLA requests may be associated with meeting one or more QoS requirements such as minimum available bandwidth and/or latency for point to point connections through a fabric (e.g., that includes switch 130) to other applications hosted by other compute nodes coupled with the fabric.

In some examples, HFI logic 121 may be composed of one or more add-in-boards, daughter cards, network interface cards (NICs), controller chips, chipsets, or other devices that may be resident on compute node 120. For example, HFI logic 121 may be integrated with one or more processors, embodied as an expansion card coupled to compute node 120, part of a system on a chip (SoC), or included on a multichip package that also contains one or more processors. Additionally or alternatively, in some examples, functionality of HFI logic 121 may be integrated into one or more components of compute node 120 at the board level, socket level, chip level, and/or other levels.

According to some examples, as shown in FIG. 2, HFI logic 121 includes HFI communication feature 228. HFI communication feature 228 may include any communication circuitry, devices, or collection thereof, capable of enabling wireless and/or wired communications between computing nodes 120 and other elements of system 100 such as switch 130. HFI communication feature 228 may be configured to use one or more communication technologies (e.g., wireless or wired communication technologies) and protocols. For examples, communication technologies associated with standardized communication protocols such as IEEE 802.3 and/or associated with proprietary-based communication protocols such as, but not limited to, Intel's Fabric Technology using the Intel Omni-Path architecture (Intel OPA).

In some examples, as shown in FIG. 2, HFI logic 121 also includes a fabric QoS request feature 226. Fabric QoS request feature 226 may be responsible to forward SLA requests from applications hosted by compute node 120. The SLA requests may be received via queue pair command(s) 210. Each SLA request may be from an application that wants to meet QoS requirements associated with an SLA for a point to point connection with another application routed through a fabric (e.g., that includes switch 130). The SLA requests may be forwarded to QoS manager 110. As described more below, QoS manager 110 may include logic and/or features to grant the SLA request and cause the allocation of resources to meet the QoS requirements associated with the SLA.

According to some examples, as shown in FIG. 2, HFI logic 121 also includes a fabric QoS table feature 224. Fabric QoS table feature 224 may store and maintain application-specific information for SLA requests forwarded by fabric request feature 226 to QoS manager 110. For these examples, application-specific information such as an assigned identifier for the requesting application and information indicating what has been requested in order to meet the QoS requirements may be maintained by fabric QoS table feature 224. In some examples, respectively assigned identifiers for requesting applications may be process address space identifiers (PASIDs) that are unique to each compute node that hosts requesting applications.

In some examples, application-specific information for granted SLA requests may be maintained in a table 230. For these examples, as shown in FIG. 2, table 230 includes a PASID field 232 that may include PASIDs for applications having granted SLA requests. Table 230 also includes a bandwidth (BW) field 234 that may indicate what bandwidth was granted responsive to the SLA request. Table 230 also includes an input/output field 235 that may indicate whether the bandwidth was for input from the fabric to the compute node or was for output from the compute node to the fabric. Table 230 also includes a credits field 236 that may indicate what credits (e.g., associated with available allocated bandwidth at the compute node) are available to the application. Available credits may be based on dynamic information continually maintained or monitored after an SLA request has been granted to an application while the application is running on a hosting compute node 120. Table 230 also includes a QoS type field 238 that may indicate whether an SLA requires that QoS requirements must be met (hard) or may be based on a best effort (soft).

According to some examples, fabric request feature 226 may be capable of using information maintained by fabric QoS table feature 224 in table 230 to control an injection rate per PASID based instance. For these examples, fabric request feature 226 may use the information in BW input/output field 235 or credits field 236 to determine whether to throttle bandwidth allocated to a given application at a compute node. For example, if a first PASID had a relatively high amount of credits in credits field 236 compared to a second PASID, fabric request feature 226 may throttle back bandwidth allocated to an application assigned the second PASID in order to provide more available bandwidth or additional credits to another application assigned the first PASID.

Figure 3:
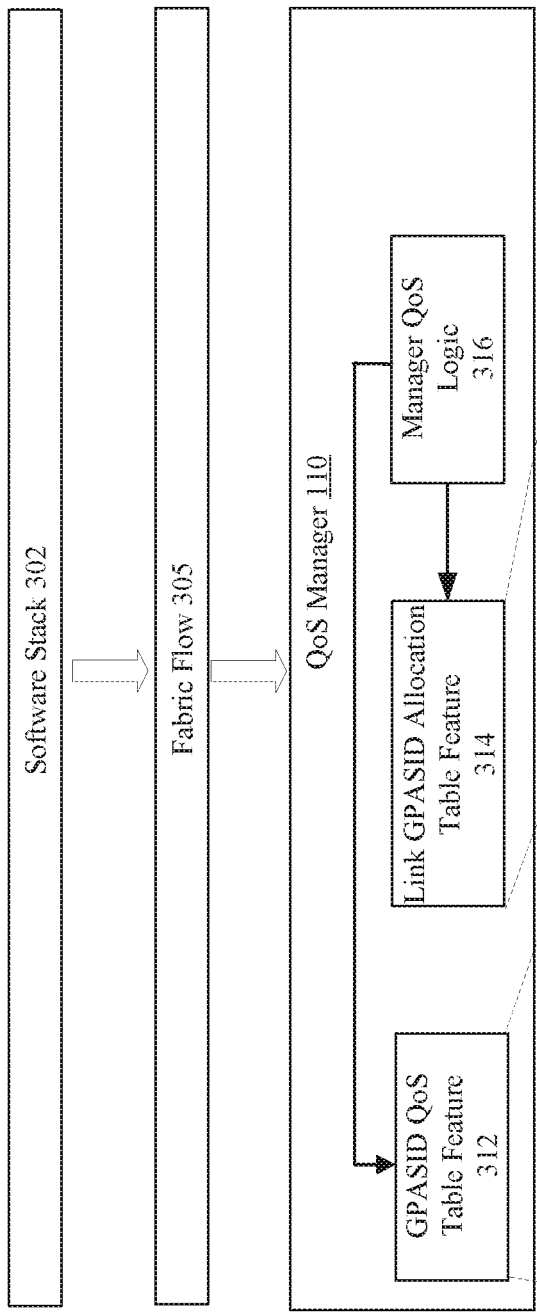
FIG. 3 illustrates an example third system.

FIG. 3 illustrates an example system 300. In some examples, as shown in FIG. 3, system 300 includes QoS manager 110. For these examples, QoS manager 110 as shown in FIG. 3, may be a more detailed view to illustrate logic and/or features included in a QoS manager for a data center, HPC network, telecommunications core network, enterprise network or a cloud-based distributed network such as for system 100 shown in FIG. 1.

In some examples, as shown in FIG. 3, QoS manager 110 includes a global PASID QoS table feature 312, a link PASID allocation table feature 314 and a manager QoS logic 316. Software stack 302 may be associated with fabric flows 305 that facilitates processing of forwarded SLA requests by logic and/or features of QoS manager 110 such as manager QoS logic 316. Fabric flows 305 may relay information associated with registering or deregistering SLA requests forwarded from logic and/or features of HFI logic 121 located at respective compute nodes 120. Fabric flow 305 may relay this information via use of layer 4 (L4) communication protocols. As mentioned previously, compute nodes 120 may host applications placing the SLA requests in order to meet one or more QoS requirements.

According to some examples, Global PASID (GPASID) QoS table feature 312 may be arranged to maintain or store different point to point bandwidth allocations granted responsive to SLA requests originating from different applications hosted by compute nodes 120. GPASID QoS table feature 312 may maintain the different point to point bandwidth allocations in a table 320. For these examples, as shown in FIG. 3, table 320 includes a GPASID field 322 and a BW allocation field 324.

In some examples, global PASIDs included in GPASID field 322 of table 320 may include an identifier for the compute node hosting a requesting application followed by a PASID assigned to the requesting application at the compute node. For example, the GPASIDs shown in FIG. 3 in GPASID field 322 may include respective GPASIDs for two requesting applications at compute node 120-1 and for two requesting application at compute node 120-2. The first requesting application at compute node 120-1 (120-1 123123) requested a BW allocation of 1 Gbps, the second requesting application (120-1 546644) requested a BW allocation of 10 Gbps. Meanwhile, the first requesting application at compute node 120-2 (120-2 222444) requested a BW allocation of 2 Gbps, the second requesting application at compute node 120-2 (120-2 1515233) requested a BW allocation of 3 Gbps.

According to some examples, link GPASID allocation table feature 314 may be arranged to maintain or store what GPASIDs for requesting applications have been allocated links routed through the fabric that includes switch 130. Link GPASID allocation table feature 314 may maintain what GPASIDs for requesting applications have been allocated links in a table 330. For these examples, as shown in FIG. 3, table 330 includes a link field 332 and an allocated GPASID field 334.

In some examples, links 132-1, 132-2, 132-4 and 132-5 included in link field 332 may be links allocated to requesting applications to establish point to point connections through the fabric that includes switch 130. For these examples and referring to FIG. 1, applications having PASIDs 123123 and 546644 hosted at compute node 120-1 may have been granted SLA requests for point to point connections to applications having PASIDs 222444 and 1515233 hosted at compute node 120-4 and applications hosted at compute node 120-2 may have been granted SLA requests for point to point connections to applications hosted at compute node 120-5. For these examples, manager QoS logic 316 may have allocated resources to provide requested bandwidths of 1 Gbps and 10 Gbps through links 132-1 and 132-3 coupled with switch 130 (see FIG. 1) to fulfill SLA requests for applications having PASIDs 123123 and 546644 at compute node 120-1. Also, manager QoS logic 316 may have allocated resources to provide requested bandwidths of 2 Gbps and 3 Gbps through links 132-2 and 132-4 coupled with switch 130 (see FIG. 1) to fulfill SLA requests for applications having PASIDs 222444 and 1515233 at compute node 120-2.

According to some examples, the logic and/or features of QoS manager 110 may be implemented as a new management component of a data center, HPC network, telecommunications core network, enterprise network or a cloud-based distributed network. For example, located on or at a new type of compute or management node arranged for processing and monitoring SLA requests. In other examples, the logic and/or features of QoS manager 110 may be implemented at a compute node as part of existing node architectures that may also host applications or may perform other management functions. For these other examples, the logic and/or features of QoS manager 110 may be implement using processor circuitry at a compute node or may be implemented via a separate a field programmable gate array (FPGA) or application specific integrated circuit (ASIC).

Although not shown, a given data center, HPC network, telecommunications core network, enterprise network or cloud-based distributed network may be divided into multiple QoS domains. Each of these domains may include a QoS manager similar to QoS manager 110. These separate QoS managers may interact in order to establish SLAs between the QoS domains to guarantee a certain inter-domain QoS bandwidth.

Figure 4:
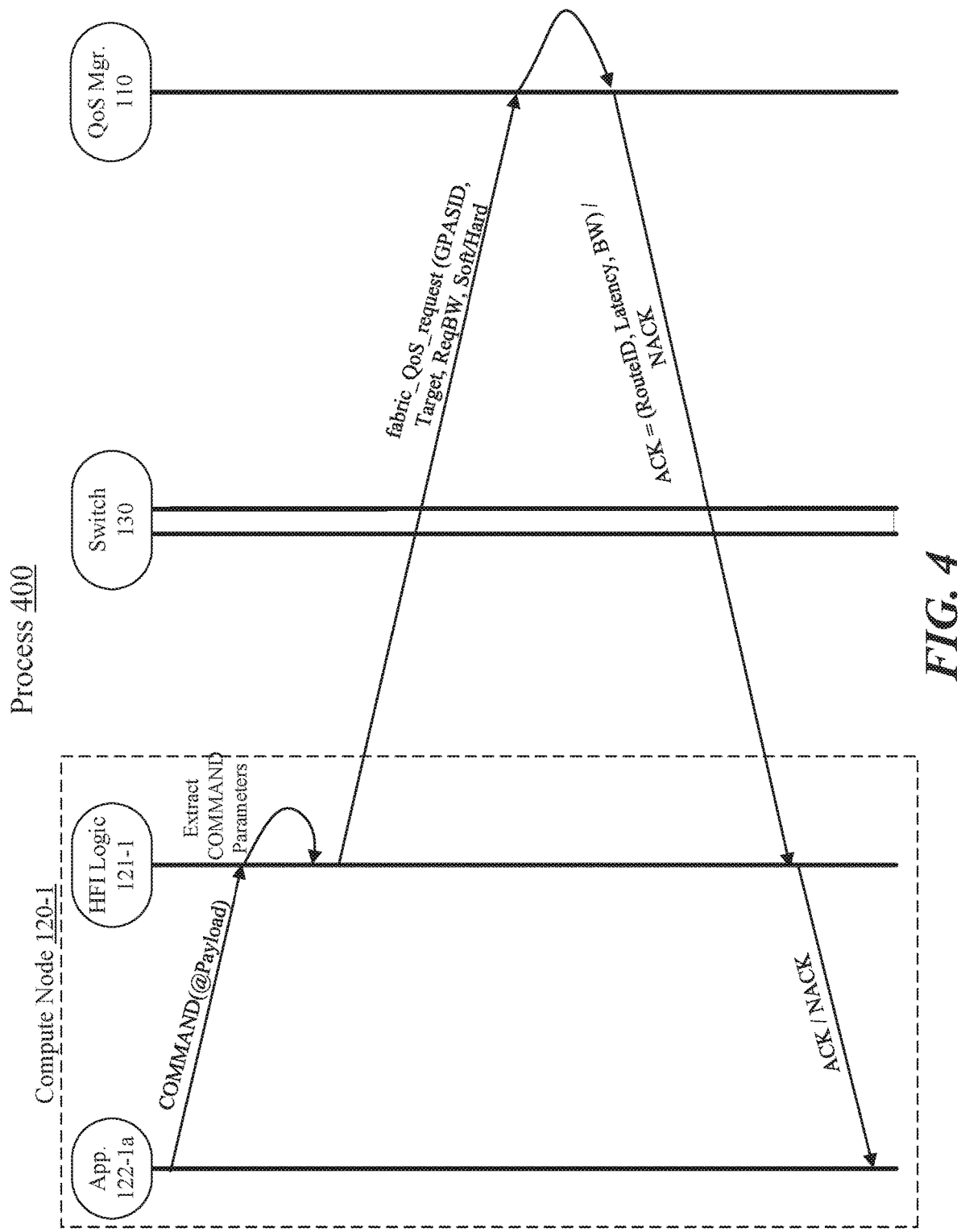
FIG. 4 illustrates an example first process.

FIG. 4 illustrates an example process 400. According to some examples, process 400 may be an example of a registration flow for an SLA request submitted by an application hosted by a compute node. For these examples, elements of systems 100, 200 or 300 as shown in FIGS. 1-3 may implement at least portions of process 400. Example for implementing process 400 are not limited to elements of systems 100, 200 or 300.

According to some examples, application 122-1a hosted by compute node 120-1 may generate an SLA request that is forwarded by logic and/or features of HFI logic 121-1. The SLA request may be forwarded through switch 130 to QoS manager 110 and the SLA request may either be granted (acknowledgement (ACK)) or not granted (negative acknowledgement (NACK). For these examples, application 122-1a may generate an SLA request that desires allocated bandwidth to meet one or more QoS requirements for a point to point connection with another application (target) hosted by a compute node coupled with switch 130. The one or more QoS requirements may be for an SLA associated with the application making the SLA request. The generated SLA request may be included in the payload of the COMMAND (@payload) sent to HFI logic 121-1. COMMAND(@payload) may be a queue pair command via which the parameters included in the COMMAND(@payload) are extracted by logic and/or features of HFI logic 121-1 (e.g., fabric QoS request feature 226). Those parameters may include, but are not limited to, a target application for the point to point connection, a requested bandwidth for the point to point connection and whether the one or more QoS requirements for the SLA must be met (hard) or are best effort (soft). Optionally, the parameters may also include latency information that indicates a maximum latency needed to meet the one or more QoS requirements.

In some examples, as shown in FIG. 4, HFI logic 121-1 may forward or generate a fabric_QoS_request that includes the GPASID assigned to application 122-1a, the target for the point to point connection, requested bandwidth and whether the one or more QoS requirements are hard or soft. Logic and/or features of QoS manager 110 may assess the different routing options through switch 130 for the point to point connection between the application 122-1a and the target application. If a latency parameter were included in the fabric QoS request, QoS manager 110 may estimate latency for each potential route. Logic and/or features of QoS manager 110 such as link GPASID allocation table feature 314 may check link field 332 of table 330 to determine whether links that may participate in a potential route have enough non-SLA allocated bandwidth to satisfy the SLA request put forth by application 122-1a. If enough non-SLA allocated bandwidth is available, logic and/or features of QoS manager 110 such as manager QoS logic 316 may choose the potential route with the lowest estimated latency and send an ACK to HFI logic 121-1 that includes a route ID, the estimated latency and bandwidth allocated. If none of the potential routes provide enough allocated bandwidth and a soft QoS requirement is indicated in the SLA request, logic and/or features of QoS manager 110 such as manager QoS logic 316 may select a route having a higher available bandwidth for allocation and then send an ACK to HFI logic 121-1 that includes a route ID for the route having a higher available bandwidth compared to other routes, the estimated latency for this route and bandwidth allocated. If none of the potential routes provide enough allocated bandwidth and a hard QoS requirement is indicated in the SLA request, manager QoS logic 316 may send a NACK to HFI logic 121-1. HFI logic 121-1 may forward either an ACK to application 122-1a to indicate the QoS requirements for the SLA request has been met or a NACK to application 122-1a to indicate the QoS requirements for the SLA request have not been met (e.g., not enough available bandwidth or latency times for available routes exceed maximum latency times).

According to some examples, if manager QoS logic 316 may cause an ACK to be sent to HFI logic 121-1, the GPASID assigned to application 122-1a as well as the allocated bandwidth may be added to table 320 maintained by GPASID QoS table feature 312. Also, the links included in the route and the GPASID assigned to application 122-1a may be added to table 330 by link GPASID allocation table feature 314. Process 400 for the registration flow for the SLA request submitted by application 122-1a may then come to an end.

Figure 5:
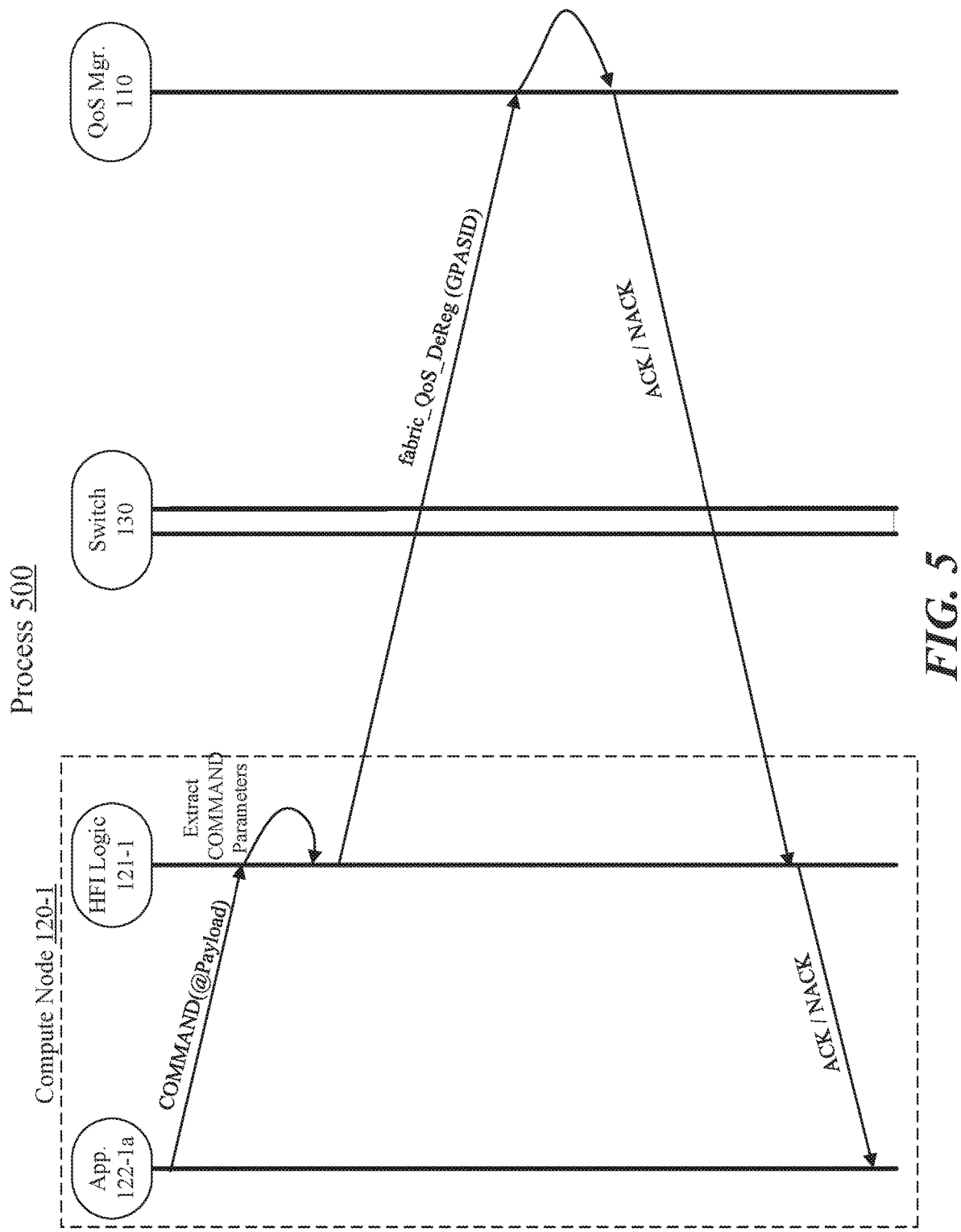
FIG. 5 illustrates an example second process.

FIG. 5 illustrates an example process 500. According to some examples, process 500 may be an example of a deregistration flow for an SLA request submitted by an application hosted by a compute node. For these examples, elements f systems 100, 200 or 300 as shown in FIGS. 1-3 may implement at least portions of process 500. Examples are not limited to elements of systems 100, 200 or 300 implementing process 500.

According to some examples, application 122-1a hosted by compute node 120-1 may generate a request to deregister a previously granted SLA request. For these examples, the request to deregister the previously granted SLA request may be forwarded by logic and/or features of HFI logic 121-1. The request may be forwarded through switch 130 to QoS manager 110 and the deregister request may either be granted (ACK) or not granted (NACK). For these examples, application 122-1a may generate the requests to deregister an SLA request for a point to point connection with another application (target) hosted by a compute node coupled with switch 130. The request may be included in the payload of the COMMAND(@payload) sent to HFI logic 121-1. COMMAND(@payload) may be a queue pair command via which the parameters included in the COMMAND(@payload) are extracted by logic and/or features of HFI logic 121-1 (e.g., fabric QoS request feature 226). Those parameters may include, but are not limited to, a PASID assigned to application 122-1a and an indication to deregister a granted SLA request.

In some examples, as shown in FIG. 5, HFI logic 121-1 may forward or generate a fabric_QoS_DeReg that includes the GPASID assigned to application 122-1a. For these examples, logic and/or features of QoS manager 110 may accept (ACK) or reject (NACK) the request. HFI logic 121-1 may then forward the ACK or NACK to application 121-1a to indicate whether the request to deregister the SLA request has been accepted. Process 500 for the deregistration flow for the SLA request submitted by application 122-1a may then come to an end.

Figure 6:
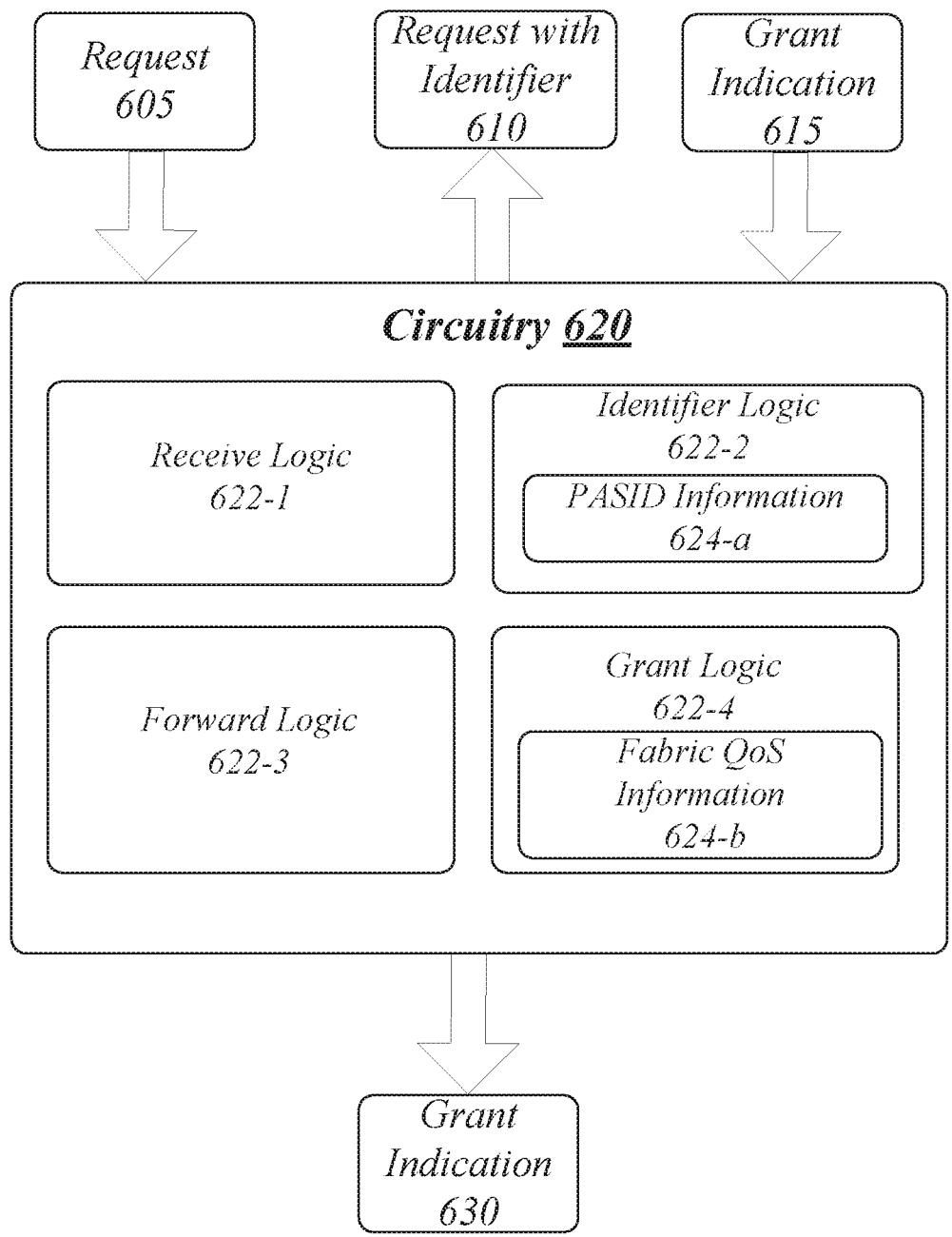
FIG. 6 illustrates an example block diagram for a first apparatus.

FIG. 6 illustrates an example block diagram for an apparatus 600. Although apparatus 600 shown in FIG. 6 has a limited number of elements in a certain topology, it may be appreciated that the apparatus 600 may include more or less elements in alternate topologies as desired for a given implementation.

According to some examples, apparatus 600 may be associated with host fabric interface logic for a compute node coupled with a fabric. For example, HFI logic 121 as shown in FIG. 1 or 2. Apparatus 600 may be supported by circuitry 620. For these examples, circuitry 620 may be incorporated within a processor, CPU or FPGA maintained at a compute node coupled with a fabric associated with apparatus 600. Circuitry 620 may be arranged to execute one or more software, firmware or hardware implemented modules, components or logic 622-$a$ (module, component or logic may be used interchangeably in this context). It is worthy to note that "a" and "b" and "c" and similar designators as used herein are intended to be variables representing any positive integer. Thus, for example, if an implementation sets a value for a=4, then a complete set software, firmware and/or hardware for logic 622-$a$ may include logic 622-1, 622-2, 622-3 or 622-4. The examples presented are not limited in this context and the different variables used throughout may represent the same or different integer values. Also, "logic", "module" or "component" may also include software/firmware stored in computer-readable media, and although the types of logic are shown in FIG. 6 as discrete boxes, this does not limit these components to storage in distinct computer-readable media components (e.g., a separate memory, etc.).

According to some examples, circuitry 620 may include a processor, processor circuit or processor circuitry. Circuitry 620 may be generally arranged to execute or implement one or more modules, components or logic 622-$a$. Circuitry 620 may be all or at least a portion of any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 620 may also include an application specific integrated circuit (ASIC) and at least some logic 622-$a$ may be implemented as hardware elements of the ASIC. According to some examples, circuitry 620 may also include a field programmable gate array (FPGA) and at least some logic 622-$a$ may be implemented as hardware elements of the FPGA.

According to some examples, apparatus 600 may include receive logic 622-1. Receive logic 622-1 may be executed or implemented by circuitry 620 to receive a request from a first application hosted by the first compute node. The request may be included in request 605. Request 605 may include parameters for a point to point connection routed through at least one switch included in the fabric. The parameters may include a targeted second application hosted by a second computing node coupled with the fabric and a requested bandwidth through the fabric to meet one or more QoS requirements for the point to point connection.

In some examples, apparatus 600 may include identifier logic 622-2. Identifier logic 622-2 may be executed or implemented by circuitry 620 to add an identifier to the request that includes both a first identifier for the first application and a second identifier for the first compute node. For these examples, the identifier may be a PASID assigned to the first application. Identifier logic 622-2 may determine the PASID based on PASID information 624-$a$ maintained by or accessible to identifier logic 622-2. PASID information 624-$a$ may be maintained in a lookup table and may include assigned PASIDs for applications hosted by the first compute node.

According to some examples, apparatus 600 may include forward logic 622-3. Forward logic 622-3 may be executed or implemented by circuitry 620 to forward the request with the identifier to a manager for the fabric. For these examples, request with identifier 610 includes the forwarded request.

In some examples, apparatus 600 may include grant logic 622-4. Grant logic 622-4 may be executed or implemented by circuitry 620 to receive an indication whether the request has been granted by the manager. The indication may include a route through the fabric for the point to point connection and allocated bandwidth for the point to point connection if the request was granted. For these examples, the grant indication may be included in grant indication 615. Grant logic 622-4 may maintain information related to the granted request with fabric QoS information 624-$b$ (e.g. maintained in a lookup table).

According to some examples, forward logic 622-3 may also forward the indication of whether the request has been granted by the manger to the first application that originated the request. For these examples, grant indication 630 included the forwarded grant indication.

Various components of apparatus 600 and a server or node implementing apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example of a logic flow 700. Logic flow 700 may be representative of some or all of the operations executed by one or more logic, features, or devices described herein, such as apparatus 600. More particularly, logic flow 700 may be implemented by at least receive logic 622-1, identifier logic 622-2, forward logic 622-3 or grant logic 622-4.

According to some examples, logic flow 700 at block 702 may receive a request from a first application hosted by a first compute node coupled with a fabric, the request including parameters for a point to point connection routed through at least one switch included in the fabric, the parameters including a targeted second application hosted by a second computing node coupled with the fabric and a requested bandwidth through the fabric to meet one or more QoS requirements for the point to point connection. For these examples, receive logic 622-1 may receive the request.

In some examples, logic flow 700 at block 704 may add an identifier to the request that includes both a first identifier for the first application and a second identifier for the first compute node. For these examples, identifier logic 622-2 may add the identifier.

According to some examples, logic flow 700 at block 706 may forward the request with the identifier to a manager for the fabric. For these examples, forward logic 622-3 may forward the request.

In some examples, logic flow 700 at block 708 may receive an indication whether the request has been granted by the manager, the indication including a route through the fabric for the point to point connection and allocated bandwidth for the point to point connection if the request was granted. For these examples, grant logic 622-4 may receive the indication.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
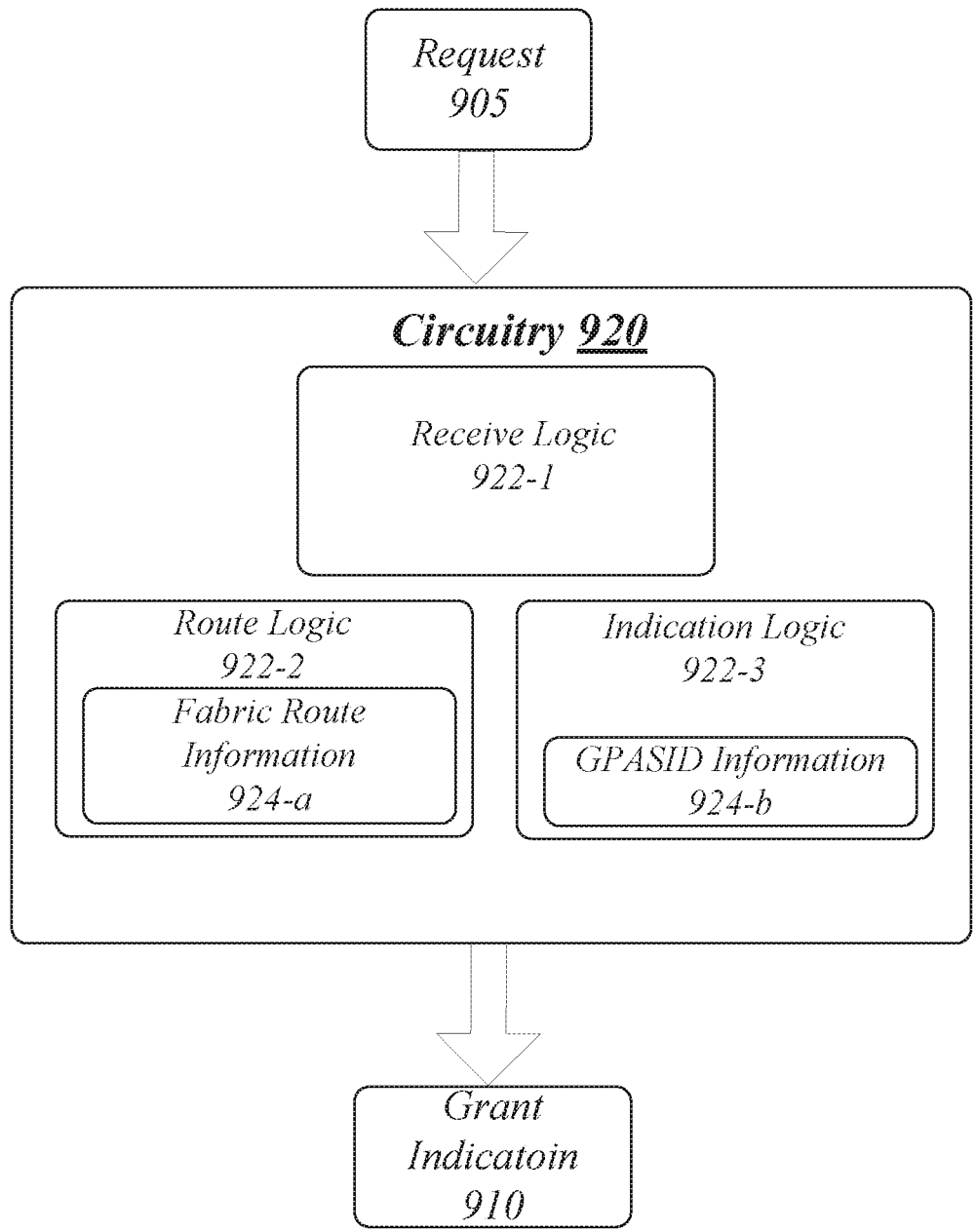
FIG. 9 illustrates an example block diagram for a second apparatus.

FIG. 9 illustrates an example block diagram for an apparatus 900. Although apparatus 900 shown in FIG. 9 has a limited number of elements in a certain topology, it may be appreciated that the apparatus 900 may include more or less elements in alternate topologies as desired for a given implementation.

According to some examples, apparatus 900 may be associated with a logic and/or features of a QoS manager for a fabric that interconnects compute nodes in a data center, an HPC network, a telecommunications core network, an enterprise network or cloud-based distributed network. For example, QoS manager 110 as shown in FIGS. 1 and 3. Apparatus 900 may be supported by circuitry 920. For these examples, circuitry 920 may be incorporated within a processor, CPU or FPGA maintained at a compute node coupled with fabric. Circuitry 920 may be arranged to execute one or more software, firmware or hardware implemented modules, components or logic 922-a (module, component or logic may be used interchangeably in this context). It is worthy to note that "a" and "b" and "c" and similar designators as used herein are intended to be variables representing any positive integer. Thus, for example, if an implementation sets a value for a=3, then a complete set software, firmware and/or hardware for logic 922-a may include logic 922-1, 922-2 or 922-3. The examples presented are not limited in this context and the different variables used throughout may represent the same or different integer values. Also, "logic", "module" or "component" may also include software/firmware stored in computer-readable media, and although the types of logic are shown in FIG. 9 as discrete boxes, this does not limit these components to storage in distinct computer-readable media components (e.g., a separate memory, etc.).

According to some examples, circuitry 920 may include a processor, processor circuit or processor circuitry. Circuitry 920 may be generally arranged to execute or implement one or more modules, components or logic 922-a. Circuitry 920 may be all or at least a portion of any of various commercially available processors to include but not limited to the processors mentioned above for apparatus 900. Also, according to some examples, circuitry 920 may also be an ASIC and at least some logic 922-a may be implemented as hardware elements of the ASIC. According to some examples, circuitry 920 may also include an FPGA and at least some logic 922-a may be implemented as hardware elements of the FPGA.

In some examples, apparatus 900 may include receive logic 922-1. Receive logic 922-1 may be executed or implemented by circuitry 920 to receive a request originating from a first application hosted by a first compute node coupled with a fabric. The request may be included in request 905 and may have an identifier that identifies both the first application and the first compute node. The request may indicate a targeted second application hosted by a second compute node coupled with the fabric. The request may also to indicate a requested bandwidth through the fabric to meet one or more QoS requirements for the point to point connection.

According to some examples, apparatus 900 may include route logic 922-2. Route logic 922-2 may be executed or implemented by circuitry 920 to determine whether a route for the point to point connection through the fabric has enough available bandwidth to meet the one or more QoS requirements. For these examples, route logic 922-2 may maintain fabric route information 924-a (e.g., in a lookup table). Fabric route information 924-a may include information regarding various routes through the fabric to complete the point to point connection, the information including available bandwidth.

In some examples, apparatus 900 may include indication logic 922-3. Indication logic 922-3 may send an indication of whether the request has been granted. The indication may include a route through the fabric for the point to point connection and allocated bandwidth for the point to point connection if the request was granted. For these examples, the grant indication may be included in grant indication 910. If the request is granted, indication logic 922-3 may log the identification information such as an GPASID for the request granted to the first application in GPASID information 924-b (e.g., maintained in a lookup table). GPASID information 924-b may also include what bandwidth has been allocated when the request was granted.

Various components of apparatus 900 and a server or node implementing apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 10 illustrates an example of a logic flow 1000. Logic flow 1000 may be representative of some or all of the operations executed by one or more logic, features, or devices described herein, such as apparatus 900. More particularly, logic flow 1000 may be implemented by at least receive logic 922-1, route logic 922-2 or indication logic 922-3.

According to some examples, logic flow 1000 at block 1002 may receive a request originating from a first application hosted by a first compute node coupled with a fabric, the request having an identifier that identifies both the first application and the first compute node, the request indicating a targeted second application hosted by a second compute node coupled with the fabric, the request also indicating a requested bandwidth through the fabric to meet one or more QoS requirements for the point to point connection. For these examples, receive logic 922-1 may receive the request.

In some examples, logic flow 1000 at block 1004 may determine whether a route for the point to point connection through the fabric has enough available bandwidth to meet the one or more QoS requirements. For these examples, route logic 1022-2 may make the determination.

According to some examples, logic flow 1000 at block 1006 may send an indication of whether the request has been granted, the indication including a route through the fabric for the point to point connection and allocated bandwidth for the point to point connection if the request was granted. For these examples, indication logic 922-3 may send the indication.

FIG. 11 illustrates an example of a storage medium 1100. Storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
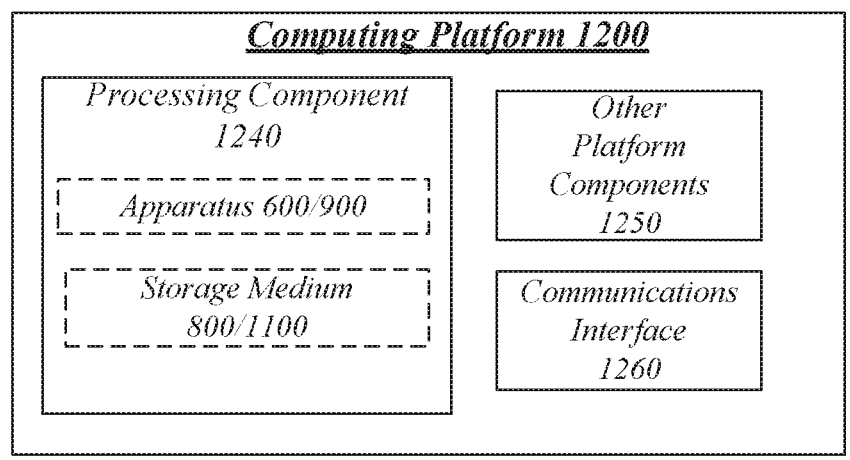
FIG. 12 illustrates an example computing platform.

FIG. 12 illustrates an example computing platform 1200. In some examples, as shown in FIG. 12, computing platform 1200 may include a processing component 1240, other platform components 1250 or a communications interface 1260. According to some examples, computing platform 1200 may be implemented in a compute node or server. The compute node or server may be capable of coupling to a fabric.

According to some examples, processing component 1240 may execute processing operations or logic for apparatus 600/1000 and/or storage medium 800/1100. Processing component 1240 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1250 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1260 may include logic and/or features to support a communication interface. For these examples, communications interface 1260 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 1200 may be implemented in a server/node of a data center. Accordingly, functions and/or specific configurations of computing platform 1200 described herein, may be included or omitted in various embodiments of computing platform 1200, as suitably desired for a compute node or server.

The components and features of computing platform 1200 may be implemented using any combination of discrete circuitry, application specific integrated circuits (ASICs), logic gates and/or single chip architectures. Further, the features of computing platform 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry at a first computing node coupled with a fabric. For these examples, the circuitry may include logic. The logic may receive a request from a first application hosted by the first compute node. The request may include parameters for a point to point connection routed through at least one switch included in the fabric, the parameters to include a targeted second application hosted by a second computing node coupled with the fabric and a requested bandwidth through the fabric to meet one or more QoS requirements for the point to point connection. The logic may also add an identifier to the request that includes both a first identifier for the first application and a second identifier for the first compute node. The logic may also forward the request with the identifier to a manager for the fabric. The logic may also receive an indication whether the request has been granted by the manager. The indication may include a route through the fabric for the point to point connection and allocated bandwidth for the point to point connection if the request was granted.

Example 2

The apparatus of example 1, the one or more QoS requirements for the point to point connection may be based on a service level agreement for the first application.

Example 3

The apparatus of example 1, the logic may receive an ACK message if the request was granted. The ACK message may include a route identifier and an amount of allocated bandwidth for the point to point connection.

Example 4

The apparatus of example 3, the logic may also forward the ACK message to the first application.

Example 5

The apparatus of example 1, the parameters may further include information to indicate a hard requirement that requires that the requested bandwidth be allocated to meet the one or more QoS requirements.

Example 6

The apparatus of example 5, the indication may include a NACK message if less than the requested bandwidth was available for allocation to the point to point connection through the fabric.

Example 7

The apparatus of example 6, the logic may also forward the NACK message to the first application.

Example 8

The apparatus of example 1, the parameters may further include information to indicate a soft requirement that allows for less than the request bandwidth to be allocated to meet the one or more QoS requirements.

Example 9

The apparatus of example 8, the indication may include an ACK message. The ACK message may include a route identifier and an amount of allocated bandwidth for the point to point connection that is less than the requested bandwidth.

Example 10

The apparatus of example 9, the logic may forward the ACK message to the first application.

Example 11

The apparatus of example 1, the first identifier may be a PASID. The PASID may be assigned to the first application. The PASID when added to the second identifier for the first compute node may generate a GPASID for use by the manager for the fabric to manage and monitor the request, if granted.

Example 12

The apparatus of example 1, the circuitry at the first computing node may be a host fabric interface.

Example 13

An example method may include receiving, at a processor circuit, a request from a first application hosted by a first compute node coupled with a fabric. The request may include parameters for a point to point connection routed through at least one switch included in the fabric. The parameters may include a targeted second application hosted by a second computing node coupled with the fabric and a requested bandwidth through the fabric to meet one or more QoS requirements for the point to point connection. The method may also include adding an identifier to the request that includes both a first identifier for the first application and a second identifier for the first compute node. The method may also include forwarding the request with the identifier to a manager for the fabric. The method may also include receiving an indication whether the request has been granted by the manager. The indication may include a route through the fabric for the point to point connection and allocated bandwidth for the point to point connection if the request was granted.

Example 14

The method of example 13, the one or more QoS requirements for the point to point connection may be based on a service level agreement for the first application.

Example 15

The method of example 14 may also include receiving an ACK message if the request was granted. The ACK message may include a route identifier and an amount of allocated bandwidth for the point to point connection.

Example 16

The method of example 15 may also include forwarding the ACK message to the first application.

Example 17

The method of example 13, the parameters may also include information to indicate a hard requirement that requires that the requested bandwidth be allocated to meet the one or more QoS requirements.

Example 18

The method of example 17, the indication may include a NACK message if less than the requested bandwidth was available for allocation to the point to point connection through the fabric.

Example 19

The method of example 18 may also include forwarding the NACK message to the first application.

Example 20

The method of example 13, the parameters may also include information to indicate a soft requirement that allows for less than the request bandwidth to be allocated to meet the one or more QoS requirements.

Example 21

The method of example 20, the indication may include an ACK message. The ACK message may include a route identifier and an amount of allocated bandwidth for the point to point connection that is less than the requested bandwidth.

Example 22

The method of example 21 may also include forwarding the ACK message to the first application.

Example 23

The method of example 13, the first identifier may be a PASID. The PASID may be assigned to the first application. The PASID when added to the second identifier for the first compute node may generate a GPASID for use by the manager for the fabric to manage and monitor the request, if granted.

Example 24

An example at least one machine readable medium may include a plurality of instructions that in response to being executed by a system cause the system to carry out a method according to any one of examples 13 to 23.

Example 25

An example apparatus may include means for performing the methods of any one of examples 13 to 23.

Example 26

An example at least one machine readable medium may include a plurality of instructions that in response to being executed by a system may cause the system to receive a request from a first application hosted by a first compute node coupled with a fabric. The request may include parameters for a point to point connection routed through at least one switch included in the fabric. The parameters may include a targeted second application hosted by a second computing node coupled with the fabric and a requested bandwidth through the fabric to meet one or more QoS requirements for the point to point connection. The instructions may also cause the system to add an identifier to the request that includes both a first identifier for the first application and a second identifier for the first compute node. The instructions may also cause the system to forward the request with the identifier to a manager for the fabric. The instructions may also cause the system to receive an indication whether the request has been granted by the manager, the indication to include a route through the fabric for the point to point connection and allocated bandwidth for the point to point connection if the request was granted.

Example 27

The at least one machine readable medium of example 26, the one or more QoS requirements for the point to point connection may be based on a service level agreement for the first application.

Example 28

The at least one machine readable medium of example 26, the instructions may also cause the system to receive an ACK message if the request was granted. The ACK message may include a route identifier and an amount of allocated bandwidth for the point to point connection.

Example 29

The at least one machine readable medium of example 28, the instructions may also cause the system to forward the ACK message to the first application.

Example 30

The at least one machine readable medium of example 26, the parameters may further include information to indicate a hard requirement that requires that the requested bandwidth be allocated to meet the one or more QoS requirements.

Example 31

The at least one machine readable medium of example 30, the indication may include a NACK message if less than the requested bandwidth was available for allocation to the point to point connection through the fabric.

Example 32

The at least one machine readable medium of example 31, the instructions may also cause the system to forward the NACK message to the first application.

Example 33

The at least one machine readable medium of example 26, the parameters may also include information to indicate a soft requirement that allows for less than the request bandwidth to be allocated to meet the one or more QoS requirements.

Example 34

The at least one machine readable medium of example 33, the indication may include an ACK message. The ACK message may include a route identifier and an amount of allocated bandwidth for the point to point connection that is less than the requested bandwidth.

Example 35

The at least one machine readable medium of example 34, the instructions may also cause the system to forward the ACK message to the first application.

Example 36

The at least one machine readable medium of example 26, the first identifier may be a PASID. The PASID may be assigned to the first application. The PASID when added to the second identifier for the first compute node may generate a GPASID for use by the manager for the fabric to manage and monitor the request, if granted.

Example 37

An example apparatus may include circuitry and a QoS manager for execution by the circuitry. The QoS manager may include logic to receive a request originating from a first application hosted by a first compute node coupled with a fabric. The request may have an identifier that identifies both the first application and the first compute node. The request may indicate a targeted second application hosted by a second compute node coupled with the fabric. The request may also indicate a requested bandwidth through the fabric to meet one or more QoS requirements for the point to point connection. The logic may also determine whether a route for the point to point connection through the fabric has enough available bandwidth to meet the one or more QoS requirements. The logic may also send an indication of whether the request has been granted, the indication to include a route through the fabric for the point to point connection and allocated bandwidth for the point to point connection if the request was granted.

Example 38

The apparatus of example 37, the one or more QoS requirements for the point to point connection may be based on a service level agreement for the first application.

Example 39

The apparatus of example 37, the logic may send the indication of whether the request has been granted to a host fabric interface at the first compute node.

Example 40

The apparatus of example 37, the indication of whether the request has been granted may be an ACK message if the request was granted. The ACK message may include a route identifier and an amount of allocated bandwidth for the point to point connection.

Example 41

The apparatus of example 37, the parameters may also include information to indicate a hard requirement that requires that the requested bandwidth be allocated to meet the one or more QoS requirements.

Example 42

The apparatus of example 41, the indication of whether the request has been granted may be a NACK message if less than the requested bandwidth was available for allocation to the point to point connection through the fabric.

Example 43

The apparatus of example 37, the parameters may also include information to indicate a soft requirement that allows for less than the request bandwidth to be allocated to meet the one or more QoS requirements.

Example 44

The apparatus of example 43, the indication of whether the request has been granted may be an ACK message. The ACK message may include a route identifier and an amount of allocated bandwidth for the point to point connection that is less than the requested bandwidth.

Example 45

The apparatus of example 37, the first identifier may be a PASID. The PASID may be assigned to the first application. The PASID when added to the second identifier for the first compute node may generate a GPASID for use to manage and monitor the request, if granted.

Example 46

An example method may include receiving, at a processor circuit, a request originating from a first application hosted by a first compute node coupled with a fabric. The request may have an identifier that identifies both the first application and the first compute node. The request may indicate a targeted second application hosted by a second compute node coupled with the fabric. The request may also indicating a requested bandwidth through the fabric to meet one or more QoS requirements for the point to point connection. The method may also include determining whether a route for the point to point connection through the fabric has enough available bandwidth to meet the one or more QoS requirements. The method may also include sending an indication of whether the request has been granted, the indication including a route through the fabric for the point to point connection and allocated bandwidth for the point to point connection if the request was granted.

Example 47

The method of example 46, the one or more QoS requirements for the point to point connection may be based on a service level agreement for the first application.

Example 48

The method of example 46 may also include sending the indication of whether the request has been granted to a host fabric interface at the first compute node.

Example 49

The method of example 46, the indication of whether the request has been granted may be an ACK message if the request was granted. The ACK message may include a route identifier and an amount of allocated bandwidth for the point to point connection.

Example 50

The method of example 46, the parameters may also include information to indicate a hard requirement that requires that the requested bandwidth be allocated to meet the one or more QoS requirements.

Example 51

The method of example 50, the indication of whether the request has been granted may include a NACK message if less than the requested bandwidth was available for allocation to the point to point connection through the fabric.

Example 52

The method of example 46, the parameters may also include information to indicate a soft requirement that allows for less than the request bandwidth to be allocated to meet the one or more QoS requirements.

Example 53

The method of example 52, the indication of whether the request has been granted may be an ACK message. The ACK message may include a route identifier and an amount of allocated bandwidth for the point to point connection that is less than the requested bandwidth.

Example 54

The method of example 46, the first identifier may be a PASID. The PASID may be assigned to the first application. The PASID when added to the second identifier for the first compute node may generate a GPASID for use to manage and monitor the request, if granted.

Example 55

An example at least one machine readable medium may include a plurality of instructions that in response to being executed by a system may cause the system to carry out a method according to any one of examples 46 to 54.

Example 56

An example apparatus may include means for performing the methods of any one of examples 46 to 54.

Example 57

An example at least one machine readable medium may include a plurality of instructions that in response to being executed by a system may cause the system to receive a request originating from a first application hosted by a first compute node coupled with a fabric. The request may have an identifier that identifies both the first application and the first compute node. The request may indicate a targeted second application hosted by a second compute node coupled with the fabric. The request may also indicate a requested bandwidth through the fabric to meet one or more QoS requirements for the point to point connection. The instructions may also cause the system to determine whether a route for the point to point connection through the fabric has enough available bandwidth to meet the one or more QoS requirements. The instructions may also cause the system to send an indication of whether the request has been granted, the indication to include a route through the fabric for the point to point connection and allocated bandwidth for the point to point connection if the request was granted.

Example 58

The at least one machine readable medium of example 57, the one or more QoS requirements for the point to point connection may be based on a service level agreement for the first application.

Example 59

The at least one machine readable medium of example 57, the instructions may also cause the system to send the indication of whether the request has been granted to a host fabric interface at the first compute node.

Example 60

The at least one machine readable medium of example 57, the indication of whether the request has been granted may include an ACK message if the request was granted. The ACK message may include a route identifier and an amount of allocated bandwidth for the point to point connection.

Example 61

The at least one machine readable medium of example 57, the parameters may also include information to indicate a hard requirement that requires that the requested bandwidth be allocated to meet the one or more QoS requirements.

Example 62

The at least one machine readable medium of example 61, the indication of whether the request has been granted may include a NACK message if less than the requested bandwidth was available for allocation to the point to point connection through the fabric.

Example 63

The at least one machine readable medium of example 57, the parameters may also include information to indicate a soft requirement that allows for less than the request bandwidth to be allocated to meet the one or more QoS requirements.

Example 64

The at least one machine readable medium of example 63, the indication of whether the request has been granted may be an ACK message. The ACK message may include a route identifier and an amount of allocated bandwidth for the point to point connection that is less than the requested bandwidth.

Example 65

The at least one machine readable medium of example 57, the first identifier may be a PASID. The PASID may be assigned to the first application. The PASID when added to the second identifier for the first compute node may generate a GPASID for use to manage and monitor the request, if granted.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
circuitry at a first computing node to be coupled with a fabric, the circuitry to include logic to:
receive a request from a first application to be hosted by the first compute node, the request to include parameters for a point to point connection routed through at least one switch included in the fabric, the parameters to include a targeted second application hosted by a second computing node coupled with the fabric and a requested bandwidth through the fabric to meet one or more quality of service (QoS) requirements for the point to point connection;
add a global identifier to the request that is derived from a process address space identifier (PASID) assigned to the first application and a compute node identifier for the first compute node, wherein the global identifier is for use by a manager for the fabric to manage and monitor the request, if granted;
forward the request with the global identifier to the manager; and
receive an indication whether the request has been granted by the manager, the indication to include a route through the fabric for the point to point connection and allocated bandwidth for the point to point connection if the request was granted.

2. The apparatus of claim 1, comprising the one or more QoS requirements for the point to point connection are based on a service level agreement for the first application.

3. The apparatus of claim 2, comprising the one or more QoS requirements for the point to point connection are also based on at least one service level agreement between the manager for the fabric and a second manager for the fabric, the manager and the second manager to manage separate QoS domains included in the fabric.

4. The apparatus of claim 1, comprising the logic to receive an acknowledgement (ACK) message if the request was granted, the ACK message to include a route identifier and an amount of allocated bandwidth for the point to point connection, the logic to forward the ACK message to the first application.

5. The apparatus of claim 1, comprising the parameters to further include information to indicate a hard requirement that requires that the requested bandwidth be allocated to meet the one or more QoS requirements.

6. The apparatus of claim 5, the indication to include a negative acknowledgement (NACK) message if less than the requested bandwidth was available for allocation to the point to point connection through the fabric, the logic to forward the NACK message to the first application.

7. The apparatus of claim 1, comprising the parameters to further include information to indicate a soft requirement that allows for less than the request bandwidth to be allocated to meet the one or more QoS requirements.

8. The apparatus of claim 7, comprising the indication to include an acknowledgement (ACK) message, the ACK message to include a route identifier and an amount of allocated bandwidth for the point to point connection that is less than the requested bandwidth, the logic to forward the ACK message to the first application.

9. The apparatus of claim 1, the circuitry at the first computing node comprises a host fabric interface.

10. A method comprising:
receiving, at a processor circuit, a request from a first application hosted by a first compute node coupled with a fabric, the request including parameters for a point to point connection routed through at least one switch included in the fabric, the parameters including a targeted second application hosted by a second computing node coupled with the fabric and a requested bandwidth through the fabric to meet one or more quality of service (QoS) requirements for the point to point connection;
adding a global identifier to the request that is derived from a process address space identifier (PASID) assigned to the first application and a compute node identifier for the first compute node, wherein the global identifier is for use by a manager for the fabric to manage and monitor the request, if granted;
forwarding the request with the global identifier to the manager; and
receiving an indication whether the request has been granted by the manager, the indication including a route through the fabric for the point to point connection and allocated bandwidth for the point to point connection if the request was granted.

11. The method of claim 10, comprising the one or more QoS requirements for the point to point connection are based on a service level agreement for the first application.

12. The method of claim 11, comprising:
receiving an acknowledgement (ACK) message if the request was granted, the ACK message including a route identifier and an amount of allocated bandwidth for the point to point connection; and
forwarding the ACK message to the first application.

13. The method of claim 10, comprising the parameters further including information to indicate a hard requirement that requires that the requested bandwidth be allocated to meet the one or more QoS requirements.

14. The method of claim 13, comprising the indication including a negative acknowledgement (NACK) message if less than the requested bandwidth was available for allocation to the point to point connection through the fabric, forwarding the NACK message to the first application.

15. The method of claim 10, comprising the parameters further including information to indicate a soft requirement that allows for less than the request bandwidth to be allocated to meet the one or more QoS requirements.

16. The method of claim 15, comprising the indication including an acknowledgement (ACK) message, the ACK message including a route identifier and an amount of allocated bandwidth for the point to point connection that is less than the requested bandwidth, forwarding the ACK message to the first application.

17. A method comprising:
receiving, at a processor circuit, a request originating from a first application hosted by a first compute node coupled with a fabric, the request having a global identifier that is derived from a process address space identifier (PASID) assigned to the first application and a compute node identifier for the first compute node, the request indicating a targeted second application hosted by a second compute node coupled with the fabric, the request also indicating a requested bandwidth through the fabric to meet one or more quality of service (QoS) requirements for the point to point connection, the global identifier for use to manage and monitor the request, if granted;

determining whether a route for the point to point connection through the fabric has enough available bandwidth to meet the one or more QoS requirements; and sending an indication of whether the request has been granted, the indication including a route through the fabric for the point to point connection and allocated bandwidth for the point to point connection if the request was granted.

18. The method of claim 17, the indication of whether the request has been granted comprises an acknowledgement (ACK) message if the request was granted, the ACK message including a route identifier and an amount of allocated bandwidth for the point to point connection.

19. The method of claim 17, comprising the parameters further including information to indicate a hard requirement that requires that the requested bandwidth be allocated to meet the one or more QoS requirements, the indication of whether the request has been granted comprises a negative acknowledgement (NACK) message if less than the requested bandwidth was available for allocation to the point to point connection through the fabric.

20. The method of claim 17, comprising the parameters further including information to indicate a soft requirement that allows for less than the request bandwidth to be allocated to meet the one or more QoS requirements, the indication of whether the request has been granted comprises an acknowledgement (ACK) message, the ACK message including a route identifier and an amount of allocated bandwidth for the point to point connection that is less than the requested bandwidth.

21. At least one non-transitory machine readable medium comprising a plurality of instructions that in response to being executed by a system cause the system to:

receive a request originating from a first application hosted by a first compute node coupled with a fabric, the request having a global identifier that is derived from a process address space identifier (PASID) assigned to the first application and a compute node identifier for the first compute node, the request to indicate a targeted second application hosted by a second compute node coupled with the fabric, the request also to indicate a requested bandwidth through the fabric to meet one or more QoS requirements for the point to point connection, the global identifier for use to manage and monitor the request, if granted;

determine whether a route for the point to point connection through the fabric has enough available bandwidth to meet the one or more QoS requirements; and send an indication of whether the request has been granted, the indication to include a route through the fabric for the point to point connection and allocated bandwidth for the point to point connection if the request was granted.

22. The at least one non-transitory machine readable medium of claim 21, comprising the instructions to further cause the system to send the indication of whether the request has been granted to a host fabric interface at the first compute node.

23. The at least one non-transitory machine readable medium of claim 21, the indication of whether the request has been granted comprises an acknowledgement (ACK) message if the request was granted, the ACK message to include a route identifier and an amount of allocated bandwidth for the point to point connection.

24. The at least one non-transitory machine readable medium of claim 21, comprising the parameters to further include information to indicate a hard requirement that requires that the requested bandwidth be allocated to meet the one or more QoS requirements, the indication of whether the request has been granted comprises a negative acknowledgement (NACK) message if less than the requested bandwidth was available for allocation to the point to point connection through the fabric.

* * * * *